United States Patent
Lee et al.

(10) Patent No.: US 11,685,369 B2
(45) Date of Patent: Jun. 27, 2023

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Indong Lee, Incheon (KR); Donghyuk Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 352 days.

(21) Appl. No.: 17/008,972

(22) Filed: Sep. 1, 2020

(65) Prior Publication Data

US 2021/0146916 A1 May 20, 2021

(30) Foreign Application Priority Data

Nov. 20, 2019 (KR) .................. 10-2019-0149621

(51) Int. Cl.
| | |
|---|---|
| *B60W 30/06* | (2006.01) |
| *G05D 1/00* | (2006.01) |
| *G05D 1/02* | (2020.01) |
| *G01S 15/931* | (2020.01) |
| *G01S 15/10* | (2006.01) |
| *G01S 7/292* | (2006.01) |

(52) U.S. Cl.
CPC ............ *B60W 30/06* (2013.01); *G01S 7/292* (2013.01); *G01S 15/101* (2013.01); *G01S 15/931* (2013.01); *G05D 1/005* (2013.01); *G05D 1/0255* (2013.01); *G01S 2015/932* (2013.01)

(58) Field of Classification Search
CPC ...... B60W 30/06; G01S 7/292; G01S 15/101; G01S 15/931; G01S 2015/932; G05D 1/005; G05D 1/0255
See application file for complete search history.

(56) References Cited

U.S. PATENT DOCUMENTS

| | | | | |
|---|---|---|---|---|
| 2009/0009306 | A1* | 1/2009 | Magane | G01S 15/931 340/435 |
| 2016/0304087 | A1* | 10/2016 | Noh | B60R 25/24 |
| 2017/0008518 | A1* | 1/2017 | Arndt | B60W 30/09 |
| 2017/0043766 | A1* | 2/2017 | Ha | B62D 15/0285 |
| 2017/0057499 | A1* | 3/2017 | Kim | B60Q 9/008 |

(Continued)

FOREIGN PATENT DOCUMENTS

KR   10-2018-0073540 A   7/2018

*Primary Examiner* — Chico A Foxx
(74) *Attorney, Agent, or Firm* — Morgan, Lewis & Bockius LLP

(57) ABSTRACT

A vehicle that can adaptively adjust a sensing distance of an ultrasonic sensor according to operation of the vehicle includes: a steering device for steering a wheel; a power device for transmitting power to the wheel; a braking device for braking the wheel; an ultrasonic sensor for detecting an external object; an input device for receiving an input from a user; a transceiver for communicating with a user terminal; and a controller for adjusting a sensing distance of the ultrasonic sensor based on whether a user input for automatic parking is received through the input device or the transceiver and controlling at least one of the steering device, the power device, or the braking device based on an output of the ultrasonic sensor and the user input.

16 Claims, 5 Drawing Sheets

(56) References Cited

U.S. PATENT DOCUMENTS

| | | | |
|---|---|---|---|
| 2018/0037262 A1* | 2/2018 | Imai | G08G 1/0962 |
| 2018/0043884 A1* | 2/2018 | Johnson | B60W 30/06 |
| 2018/0105167 A1* | 4/2018 | Kim | G05D 1/0016 |
| 2018/0267170 A1* | 9/2018 | Kuroda | G01S 15/931 |
| 2020/0062308 A1* | 2/2020 | Kim | B60W 30/06 |
| 2020/0074759 A1* | 3/2020 | Seo | B60W 30/06 |
| 2020/0094816 A1* | 3/2020 | Krekel | B62D 15/0285 |
| 2020/0118441 A1* | 4/2020 | Han | G08G 1/166 |
| 2020/0238978 A1* | 7/2020 | Suzuki | B60W 30/06 |
| 2020/0282977 A1* | 9/2020 | Hara | B60W 30/06 |
| 2020/0307555 A1* | 10/2020 | Van Wiemeersch | G05D 1/0022 |

* cited by examiner

VEHICLE AND CONTROL METHOD THEREOF

CROSS-REFERENCE TO RELATED APPLICATION

The present application is based on and claims the benefit of priority to Korean Patent Application No. 10-2019-0149621, filed on Nov. 20, 2019 in the Korean Intellectual Property Office, the disclosure of which is incorporated herein by reference.

TECHNICAL FIELD

The disclosure relates to a vehicle for adaptively adjusting the sensing distance of an ultrasonic sensor and a control method thereof.

BACKGROUND

Recently, the vehicle provides remote smart parking assist (RSPA) to assist in entering or leaving the garage or cramped right angle parking space. Specifically, the vehicle may perform forward or backward in a narrow parking space based on the forward or backward command received through the smart key.

In addition, the vehicle provides a parking distance warning (PDW) for assisting parking, and for this purpose, an ultrasonic sensor is provided.

However, in order to secure the sensing distance for providing the PDW, the ultrasonic sensor may have a blind zone in the proximity area. In this case, if an object exists in the blind zone, despite no risk of collision, forward or backward is not performed, so RSPA in a narrow parking space may not be smoothly provided.

The information disclosed in the Background section above is to aid in the understanding of the background of the present disclosure, and should not be taken as acknowledgement that this information forms any part of prior art.

SUMMARY

Therefore, it is an aspect of the present disclosure to provide a vehicle that adaptively adjusts a sensing distance of an ultrasonic sensor according to operation of a vehicle and a control method thereof.

In accordance with one aspect of the disclosure, a vehicle includes: a steering device configured to steer a wheel; a power device configured to transmit power to the wheel; a braking device configured to brake the wheel; an ultrasonic sensor configured to detect an external object; an input device configured to receive an input from a user; a transceiver configured to communicate with a user terminal; and a controller configured to adjust a sensing distance of the ultrasonic sensor based on whether a user input for automatic parking is received through the input device or the transceiver and control at least one of the steering device, the power device, or the braking device based on an output of the ultrasonic sensor and the user input.

The controller may be further configured to adjust the sensing distance of the ultrasonic sensor in a decreasing direction when receiving the user input for the automatic parking.

The controller may be further configured to adjust the sensing distance of the ultrasonic sensor in a decreasing direction when receiving a user input for a remote control through the transceiver.

The controller may be further configured to control at least one of the steering device, the power device, or the braking device based on the user input for the automatic parking or the user input for the remote control.

The controller may be further configured to adjust the sensing distance of the ultrasonic sensor in an increasing direction based on user operation of at least one of the steering device, the power device, or the braking device.

The controller may be further configured to adjust the sensing distance of the ultrasonic sensor by adjusting the output of the ultrasonic sensor.

The controller may be further configured to adjust the sensing distance of the ultrasonic sensor such that a minimum distance at which the external object can be detected is reduced when adjusting the sensing distance of the ultrasonic sensor in a decreasing direction.

The controller may be further configured to determine a degree of collision risk with the external object based on the output of the ultrasonic sensor and to control the braking device to brake when the degree of collision risk with the external object is greater than or equal to a preset value.

In accordance with one aspect of the disclosure, a control method of a vehicle including a steering device configured to steer a wheel, a power device configured to transmit power to the wheel, a braking device configured to brake the wheel, an ultrasonic sensor configured to detect an external object, an input device configured to receive an input from a user and a transceiver configured to communicate with a user terminal, the method includes: adjusting a sensing distance of the ultrasonic sensor based on whether a user input for automatic parking is received through the input device or the transceiver; and controlling at least one of the steering device, the power device, or the braking device based on an output of the ultrasonic sensor and the user input.

The adjusting the sensing distance of the ultrasonic sensor may include: adjusting the sensing distance of the ultrasonic sensor in a decreasing direction when receiving the user input for the automatic parking.

The control method may further include: adjusting the sensing distance of the ultrasonic sensor in a decreasing direction when receiving a user input for a remote control through the transceiver.

The controlling at least one of the steering device, the power device, or the braking device may include: controlling at least one of the steering device, the power device, or the braking device based on the user input for the automatic parking or the user input for the remote control.

The control method may further include: adjusting the sensing distance of the ultrasonic sensor in an increasing direction based on user operation of at least one of the steering device, the power device, or the braking device.

The adjusting the sensing distance of the ultrasonic sensor may include: adjusting the sensing distance of the ultrasonic sensor by adjusting the output of the ultrasonic sensor.

The adjusting the sensing distance of the ultrasonic sensor may include: adjusting the sensing distance of the ultrasonic sensor such that a minimum distance at which the external object can be detected is reduced when adjusting the sensing distance of the ultrasonic sensor in a decreasing direction.

The control method may further include: determining a degree of collision risk with the external object based on the output of the ultrasonic sensor; and controlling the braking device to brake when the degree of collision risk with the external object is greater than or equal to a preset value.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
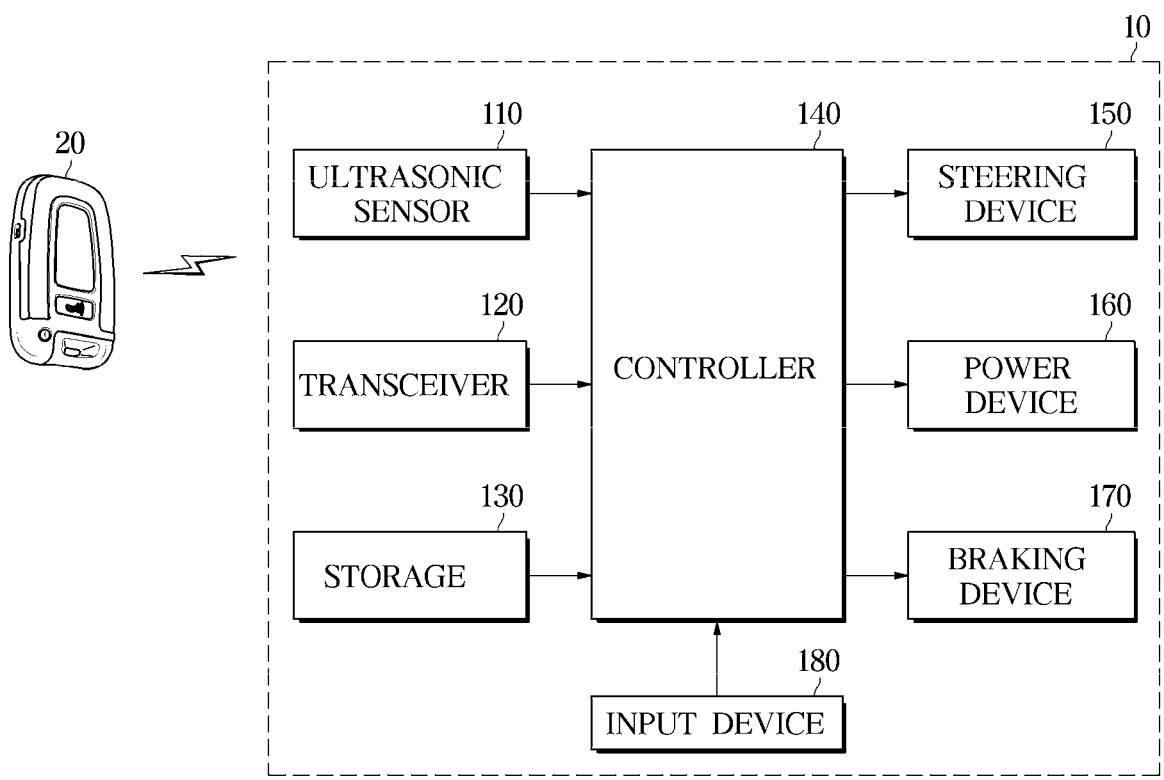
FIG. 1 is a control block diagram of a vehicle according to an exemplary embodiment of the present disclosure.

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, exemplary embodiments of a vehicle and a method of controlling the vehicle according to an aspect will be described in detail with reference to the accompanying drawings.

Figure 2:
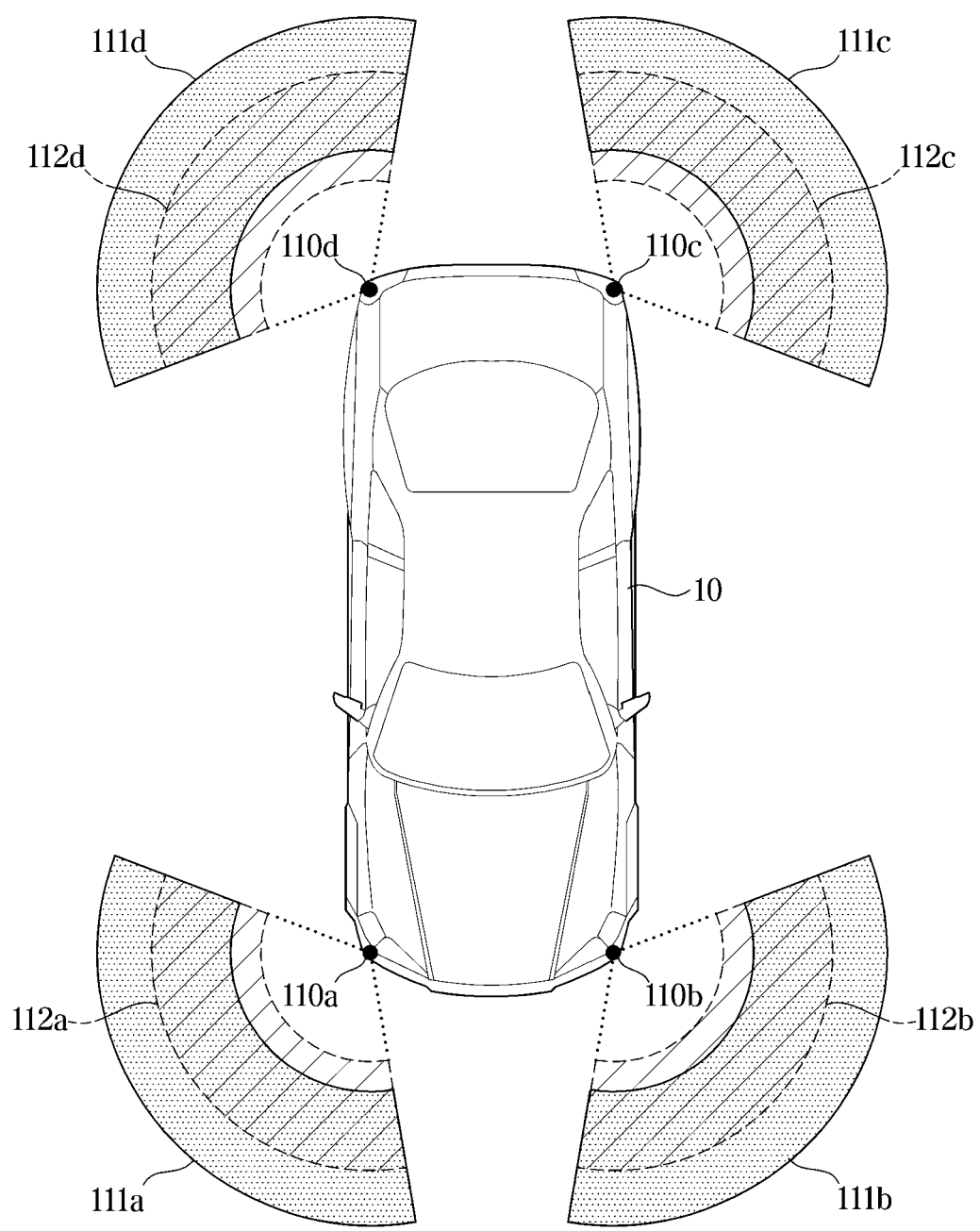
FIG. 2 is a view illustrating a sensing distance of an ultrasonic sensor of a vehicle according to an exemplary embodiment of the present disclosure.

FIG. 1 is a control block diagram of a vehicle according to an exemplary embodiment of the present disclosure. FIG. 2 is a view illustrating a sensing distance of an ultrasonic sensor of a vehicle according to an exemplary embodiment of the present disclosure.

Referring to FIG. 1, a vehicle 10 according to an exemplary embodiment includes an ultrasonic sensor 110 that senses an external object, a transceiver 120 that communicates with a user terminal 20, a storage 130 for storing various information necessary for control of the vehicle 10, a controller 140 for adjusting the sensing distance of the ultrasonic sensor 110 based on whether a user input for automatic parking is received, and a steering device 150 for steering the wheel, a power device 160 for transmitting power to the wheel, a braking device 170 for braking the wheel, and an input device 180 for receiving input for automatic parking from the user. However, according to an exemplary embodiment, each component included in the vehicle 10 may be omitted.

The ultrasonic sensor 110 according to an exemplary embodiment may detect an object located outside the vehicle 10.

Specifically, the ultrasonic sensor 110 may transmit ultrasonic waves to the outside of the vehicle 10, and may detect the location and size of an object located outside the vehicle 10 based on echo ultrasonic waves reflected and received from the object located outside the vehicle 10.

To this end, the ultrasonic sensor 110, may be disposed on the body of the vehicle 10, may be disposed on at least one of the front, side or rear side of the body of the vehicle 10. For example, as illustrated in FIG. 2, the ultrasonic sensor 110 may include a first ultrasonic sensor 110a disposed on the front right side of the body of the vehicle 10, a second ultrasonic sensor 110b disposed on the front left side, a third ultrasonic sensor 110c disposed on the rear right side, and a fourth ultrasonic sensor 110d disposed on the rear left side. However, the position and number of the ultrasonic sensors 110 are not limited if the position and number of the ultrasonic sensor 110 is a position and number that can detect an external object of the vehicle 10.

The transceiver 120 according to an exemplary embodiment may communicate with the user terminal 20.

Specifically, the transceiver 120 may receive a user input instructing automatic parking of the vehicle 10 from the user terminal 20. For example, the transceiver 120 may receive a user input instructing any one of a parking operation, a forward operation, or a backward operation of the vehicle 10.

To this end, the transceiver 120 may communicate with the user terminal 20 through wireless communication. And wireless communication may be performed by a known communication method, and may include both wireless communication through the network and direct wireless communication not through the network.

According to an exemplary embodiment of the present disclosure, the transceiver 120 may be a hardware device implemented by various electronic circuits, e.g., processor(s), to transmit and receive signals via wireless or wired connections.

At this time, the user terminal 20 may be a smart key corresponding to the vehicle 10 or a smartphone that allows communication with the vehicle 10 through authentication. However, the type of the user terminal 20 is not limited to the above example, and there is no limitation as long as it is an electronic device capable of receiving a user input indicating an operation for the vehicle 10 and transmitting it to the vehicle 10.

The storage 130 may store various information necessary for control of the vehicle 10. For example, the storage 130 may store information on a correlation between the operation of the vehicle 10 and the sensing distance of the ultrasonic sensor 110.

As such, the storage 130 may be implemented as a storage medium of a known type in order to store various information required for the vehicle 10.

The controller 140 according to an exemplary embodiment may adjust the sensing distance of the ultrasonic sensor 110 based on whether a user input instructing automatic parking or remote control is received.

Specifically, the controller 140 may receive a user input instructing automatic parking or remote control from the user terminal 20 through the transceiver 120 or a user input instructing automatic parking through the input device 180. That is, the vehicle 10 may receive a user input instructing automatic parking or remote control through the transceiver 120 when the user is outside the vehicle 10, and may receive a user input instructing automatic parking through the input device 180 when the user is inside the vehicle 10.

At this time, the remote control may mean that a user who is not located in the vehicle 10 using the user terminal 20 remotely controls the vehicle 10, and may correspond to a control command that commands the vehicle 10 to move forward or backward.

Automatic parking may mean that the vehicle 10 parks by autonomous driving using sensors such as an ultrasonic sensor 110, a camera (not shown), and a radar (not shown) without user intervention.

When receiving a user input instructing automatic parking or remote control, the controller 140 may adjust the sensing distance of the ultrasonic sensor 110 in a decreasing direction.

In addition, the controller 140 may adjust the sensing distance of the ultrasonic sensor 110 in an increasing direction when there is user operation for at least one of steering device 150, power device 160, or braking device 170 without receiving a user input instructing automatic parking.

As such, the vehicle 10, in the case of user input instructing remote control or automatic parking, may adjust the sensing distance of the ultrasonic sensor 110 in a decreasing direction when operating without user operation and may adjust the sensing distance of the ultrasonic sensor 110 in an increasing direction when operating according to a user operation.

At this time, the controller 140 may adjust the sensing distance of the ultrasonic sensor 110 by adjusting the output of the ultrasonic sensor 110. That is, the ultrasonic sensor 110 may transmit the ultrasonic signal weakly by reducing the transmission sensitivity when the sensing distance is adjusted in a decreasing direction, and may transmit the ultrasonic signal strongly by increasing the transmission sensitivity when the sensing distance is adjusted in an increasing direction.

When the transmission sensitivity decreases, the interference of the ultrasonic signal in the vicinity of the ultrasonic sensor 110 and the ring time of the ultrasonic sensor 110 are reduced due to the shape of the vehicle 10, so that a minimum distance capable of sensing an external object can be reduced.

In other words, the controller 140 may adjust the sensing distance of the ultrasonic sensor 110 so that the minimum distance at which external objects can be detected is reduced when adjusting the sensing distance of the ultrasonic sensor 110 in a decreasing direction.

For example, the controller 140 adjusts the sensing distance of the ultrasonic sensor 110 in a decreasing direction so that the ultrasonic sensor 110 detects an external object within the reduced sensing range 112a, 112b, 112c and 112d when receiving a user input instructing automatic parking or remote control as shown in FIG. 2.

In addition, the controller 140 may adjust the sensing distance of the ultrasonic sensor 110 in an increasing direction so that the ultrasonic sensor 110 detects an external object within the expanded sensing ranges 111a, 111b, 111c, and 111d when operating according to the user operation as shown in FIG. 2.

At this time, as shown in FIG. 2, the reduced sensing ranges 112a, 112b, 112c, and 112d may have a shorter minimum distance to detect external objects than the expanded sensing ranges 111a, 111b, 111c, and 111d. Through this, the vehicle 10 according to an exemplary embodiment may provide an operation for automatic parking or remote control even in a narrower space.

The controller 140 according to an exemplary embodiment may control at least one of the steering device 150, the power device 160, or the braking device 170 based on the output of the ultrasonic sensor 110 and the user input.

For example, the controller 140 may control at least one of the steering device 150, the power device 160, or the braking device 170 when receiving a user input instructing automatic parking or remote control.

At this time, the controller 140 may determine collision risk information with an external object based on the output of the ultrasonic sensor 110, control the braking device 170 to brake when the degree of collision risk with an external object is greater than or equal to a preset value and end control of the steering device 150 and the power device 160. For example, the collision risk information may correspond to a time to collision (TCC) calculated based on a relative distance and a relative speed between the sensed external object and the vehicle 10.

The controller 140 may include at least one non-transitory memory in which programs for performing the above-described operations and the operations described below are stored, and at least one processor for executing the stored programs. In the case of a plurality of memory and processors, it is possible that they are integrated in one chip, and it is also possible to be provided in a physically separate location.

The steering device 150 according to an exemplary embodiment may adjust the driving direction of the vehicle 10 by steering the wheel. That is, the steering device 150 may steer the wheel according to the control of the controller 140 or the user operation.

The power device 160 according to an exemplary embodiment transmits power to the wheel, so that the vehicle 10 can travel. That is, the power device 160 may transmit power to the wheel according to control of the controller 140 or user operation. At this time, the power device 160 may correspond to an engine driven by fossil fuel or a motor driven by electricity, depending on the type of vehicle 10.

The braking device 170 according to an exemplary embodiment may brake the vehicle 10 by braking the wheel. That is, the braking device 170 may brake a wheel according to control of the controller 140 or user operation, and a brake device of a known type may be used.

The input device 180 according to an exemplary embodiment may receive a user input instructing automatic parking. To this end, the input device 180 may be disposed at a center fascia installed in the center of the dashboard, and may be implemented using, for example, a physical button, a knob, a touch pad, a touch screen, a stick-type manipulation device, or a trackball. However, the location and type of the input device 180 is not limited to the above example, and is not limited as long as it is a location and type capable of receiving user input instructing automatic parking inside the vehicle 10.

In addition, the vehicle 10, in order to perform a parking operation, may further include a camera (not shown) for obtaining image data for the external environment of the vehicle 10 and radar for obtaining radar data for the external environment of the vehicle 10.

Figure 3:
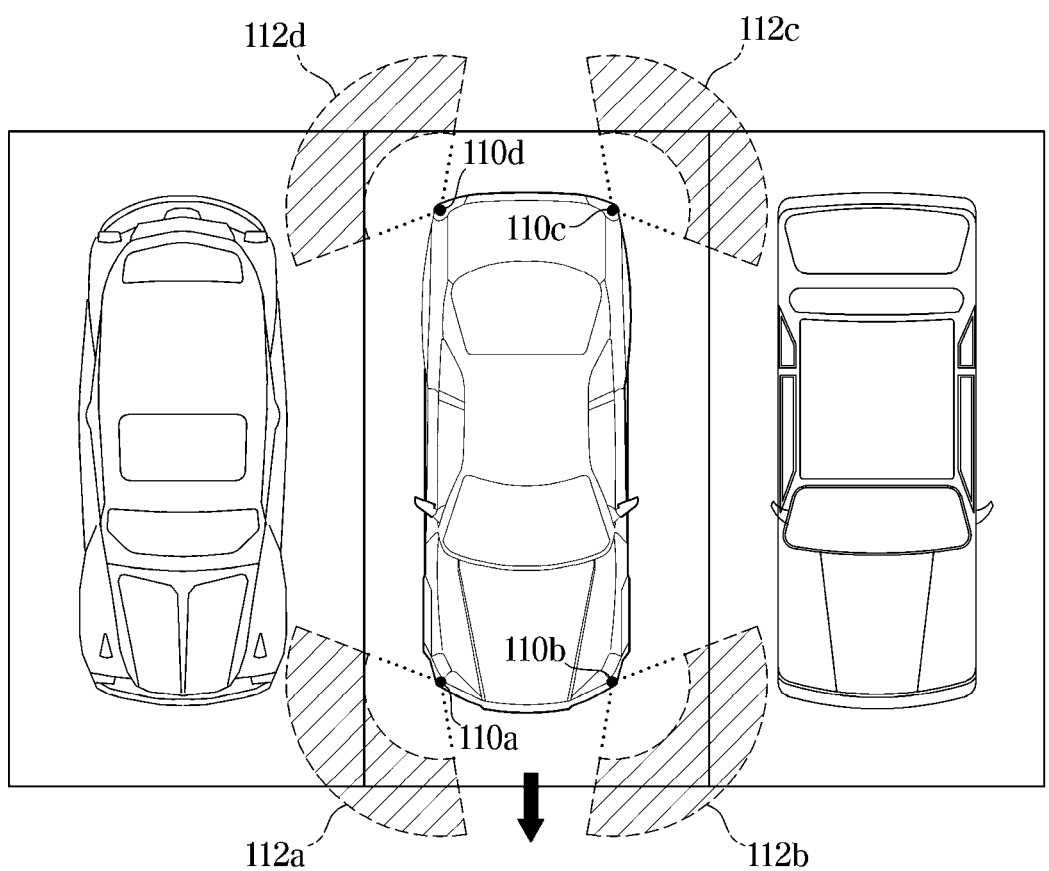
FIG. 3 is a view for describing a case in which a vehicle according to an exemplary embodiment of the present disclosure receives an input for automatic parking or remote control.
Figure 4:
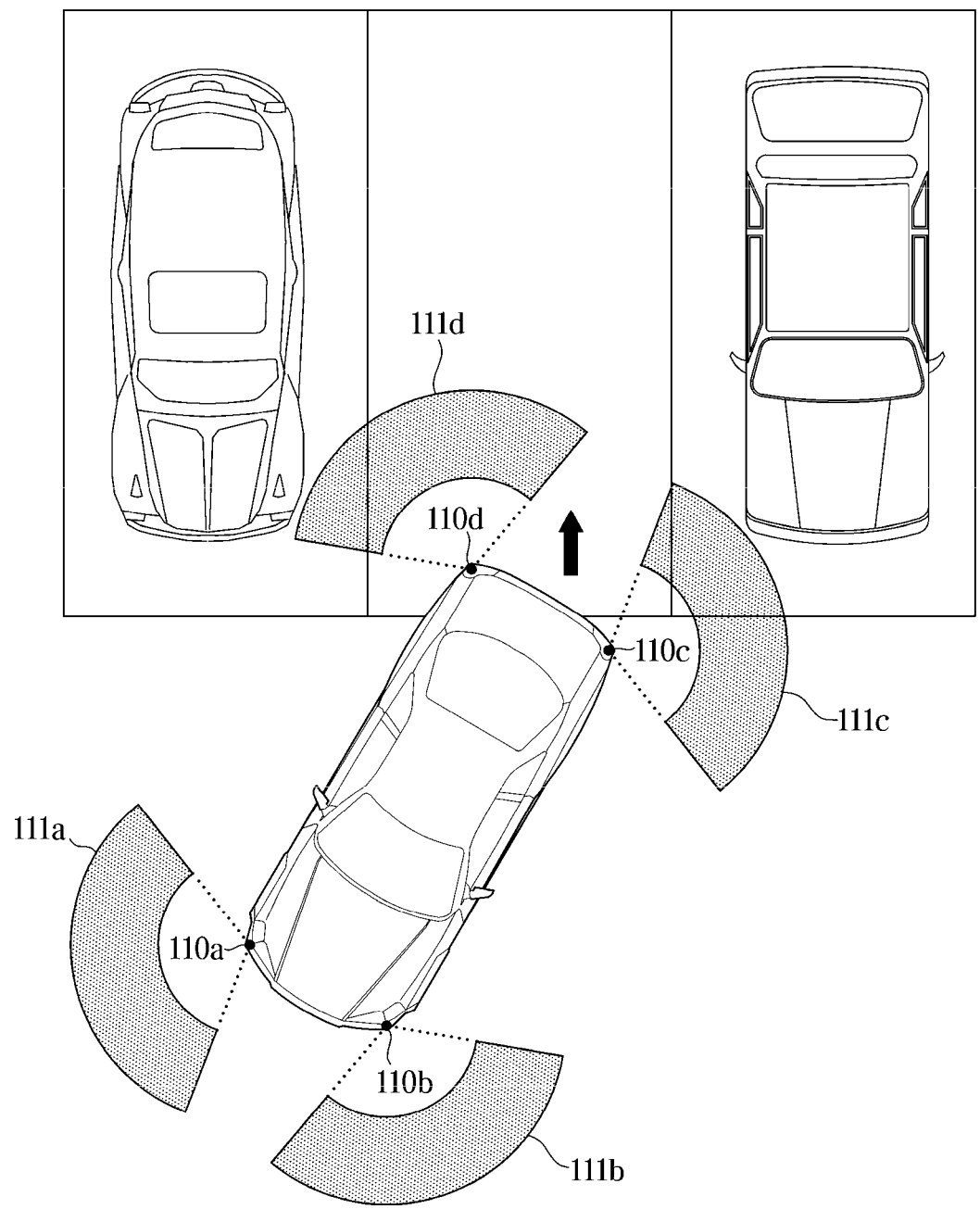
FIG. 4 is a diagram for describing a case in which a vehicle according to an exemplary embodiment of the present disclosure performs a parking operation based on a user operation.

FIG. 3 is a view for describing a case in which a vehicle according to an exemplary embodiment of the present disclosure receives an input for automatic parking or remote control. FIG. 4 is a diagram for describing a case in which a vehicle according to an exemplary embodiment of the present disclosure performs a parking operation based on a user operation.

Referring to FIG. 3 and FIG. 4, the controller 140 according to an exemplary embodiment may adjust the sensing distance of the ultrasonic sensor based on whether a user input instructing automatic parking or remote control is received.

At this time, the controller 140 may adjust the sensing distance of the ultrasonic sensor 110 by adjusting the output of the ultrasonic sensor 110. That is, the ultrasonic sensor 110 may transmit the ultrasonic signal weakly by reducing the transmission sensitivity when the sensing distance is adjusted in a decreasing direction, and may transmit the ultrasonic signal strongly by increasing the transmission sensitivity when the sensing distance is adjusted in an increasing direction.

When the transmission sensitivity decreases, the interference of the ultrasonic signal in the vicinity of the ultrasonic sensor 110 and the ring time of the ultrasonic sensor 110 are reduced due to the shape of the vehicle 10, so that a minimum distance capable of sensing an external object can be reduced.

In other words, the controller 140 may adjust the sensing distance of the ultrasonic sensor 110 so that the minimum distance at which external objects can be detected is reduced when adjusting the sensing distance of the ultrasonic sensor 110 in a decreasing direction.

That is, as shown in FIG. 3, the controller 140 may adjust the sensing distance of the ultrasonic sensor 110 so that the minimum distance capable of sensing an external object is reduced by adjusting the sensing distance of the ultrasonic sensor 110 in a decreasing direction when receiving user input instructing automatic parking or remote control. In this case, the sensing range of the ultrasonic sensor 110 may correspond to the reduced sensing ranges 112a, 112b, 112c, and 112d.

As described above, the vehicle 10 may control the ultrasonic sensor 110 to reduce the minimum distance in the sensing distance of the ultrasonic sensor 110, thereby enhancing recognition performance of objects located at a short distance of the vehicle 10 when controlling the steering device 150, power device 160 and braking device 170 based on the remote control or controlling the steering device 150, power device 160 and braking device 170 to perform automatic parking. Through this, remote smart parking assist (RSPA) in a narrow space can be more efficiently and precisely provided.

That is, the vehicle 10 may adjust the sensing distance of the ultrasonic sensor 110 in a decreasing direction when receiving the user input instructing the automatic parking or remote control input through the user terminal 20 without user operation to the vehicle 10 through the transceiver 120 or receiving user input instructing automatic parking through the input device 180.

In addition, the controller 140 may adjust the sensing distance of the ultrasonic sensor 110 so as to increase the maximum distance capable of sensing an external object by adjusting the sensing distance of the ultrasonic sensor 110 in an increasing direction when operating based on user operation (e.g., manual parking) as shown in FIG. 4. In this case, the sensing range of the ultrasonic sensor 110 may correspond to the expanded sensing ranges 111a, 111b, 111c, and 111d.

As described above, the vehicle 10 may control the ultrasonic sensor 110 to increase the maximum distance in the sensing distance of the ultrasonic sensor 110, thereby enhancing recognition performance of an object located at a long distance of the vehicle 10 when the steering device 150, the power device 160 and the braking device 170 are controlled to perform manual parking based on user operation. Through this, the vehicle 10 can secure a sensing distance (e.g., 1.2 m) in a Parking distance warning (PDW), thereby providing more stable parking assistance.

As described above, the vehicle 10 can provide a more efficient operation of the vehicle 10 by adaptively adjusting the sensing distance of the ultrasonic sensor 110 according to the operation of the vehicle 10.

When receiving a user input instructing automatic parking or remote control, the vehicle 10 may adjust the sensing distance of the ultrasonic sensor 110 in a decreasing direction. The vehicle 10 may adjust the sensing distance of the ultrasonic sensor 110 in an increasing direction when receiving a user operation (e.g., manual parking) for at least one of the steering device 150, power device 160, or braking device 170.

In other words, the vehicle 10 may adjust the sensing distance of the ultrasonic sensor 110 in a decreasing direction when a user input instructing automatic parking or remote control is received through the transceiver 120 without user operation of at least one of the steering device 150, power device 160, or braking device 170. In addition, the vehicle 10 may adjust the sensing distance of the ultrasonic sensor 110 in a decreasing direction when a user input instructing automatic parking is received through the input device 180 without user operation of at least one of the steering device 150, the power device 160, or the braking device 170.

In addition, the vehicle 10 may adjust the sensing distance of the ultrasonic sensor 110 in the increasing direction when there is a user operation of at least one of the steering device 150, power device 160 or braking device 170. Through this, it is possible to secure a sensing distance (e.g., 1.2 m) in a Parking distance warning (PDW), thereby providing more stable driving or parking.

Hereinafter, a control method of the vehicle 10 according to an exemplary embodiment will be described. The vehicle 10 according to the above-described exemplary embodiment may be applied to the control method of the vehicle 10 described later. Therefore, the contents described with reference to FIGS. 1 to 4 are equally applicable to the control method of the vehicle 10 according to an exemplary embodiment even if there is no special mention.

Figure 5:
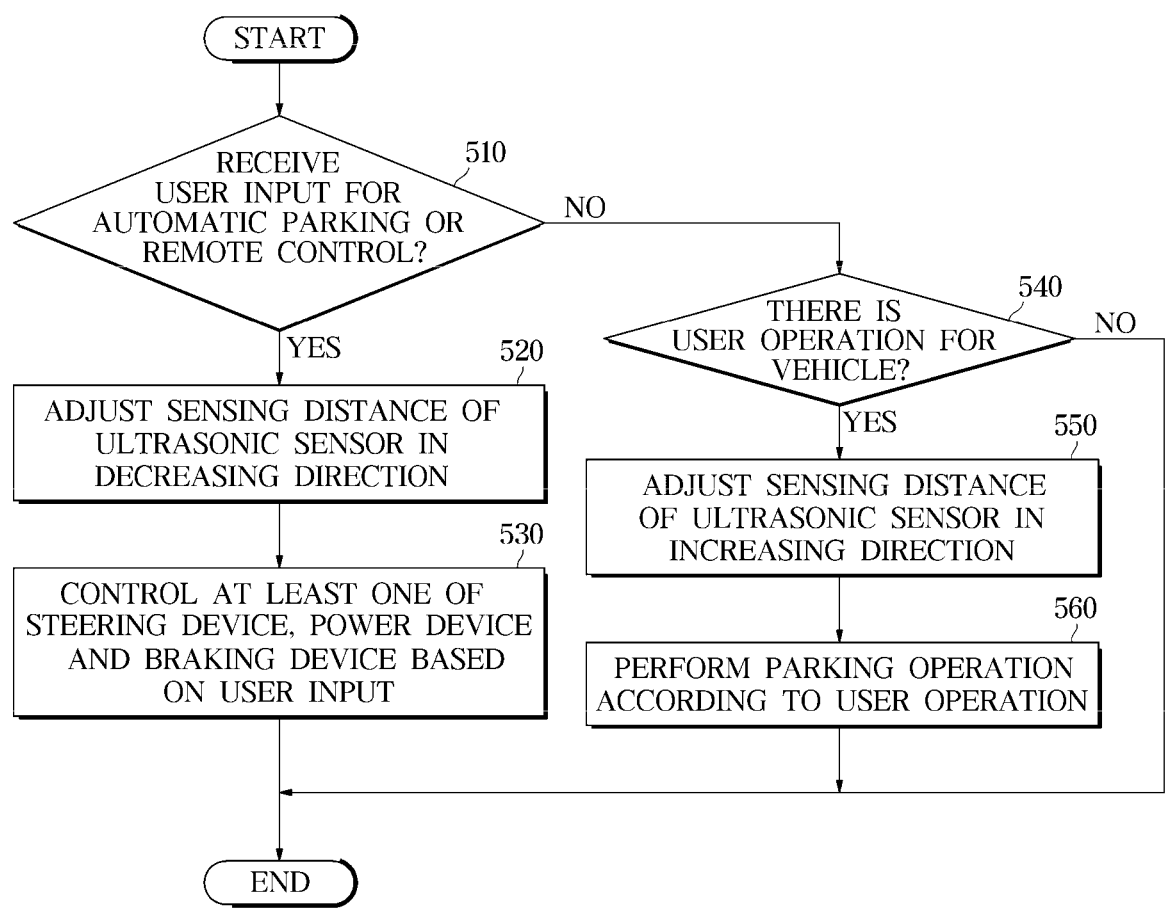
FIG. 5 is a flowchart illustrating a case in which a sensing distance of an ultrasonic sensor is adjusted based on whether a user input for automatic parking or remote control is received among control methods of a vehicle according to an exemplary embodiment of the present disclosure.

FIG. 5 is a flowchart illustrating a case in which a sensing distance of an ultrasonic sensor is adjusted based on whether a user input instructing automatic parking or remote control is received among control methods of a vehicle according to an exemplary embodiment of the present disclosure.

Referring to FIG. 5, when receiving a user input instructing automatic parking or remote control (YES in 510), the vehicle 10 according to an exemplary embodiment may adjust the sensing distance of the ultrasonic sensor 110 in a decreasing direction (520).

In this case, the vehicle 10 may control at least one of the steering device 150, the power device 160, and the braking device 170 based on the user input (530).

In addition, the vehicle 10 according to an exemplary embodiment may adjust the sensing distance of the ultrasonic sensor 110 in the increasing direction (550) when there is no user input instructing automatic parking or remote control (No in 510), and there is user operation for vehicle 10 (Yes in 540).

That is, the vehicle 10 may adjust the sensing distance of the ultrasonic sensor 110 in the increasing direction when there is a user operation (for example, manual parking) of at least one of the steering device 150, the power device 160, and the braking device 170.

In this case, the vehicle 10 may perform a parking operation according to a user operation (560). Specifically, at least one of the steering device 150, the power device 160, and the braking device 170 may operate based on user operation.

As described above, the vehicle 10 may control the ultrasonic sensor 110 to reduce the minimum distance in the sensing distance of the ultrasonic sensor 110, thereby enhancing recognition performance of objects located at a short distance of the vehicle 10 when controlling the steering device 150, power device 160 and braking device 170 based on the remote control or controlling the steering device 150, power device 160 and braking device 170 to perform automatic parking. Through this, remote smart parking assist (RSPA) in a narrow space can be more efficiently and precisely provided.

That is, the vehicle 10 may adjust the sensing distance of the ultrasonic sensor 110 in a decreasing direction when receiving the user input instructing the automatic parking or remote control input through the user terminal 20 without user operation to the vehicle 10 through the transceiver 120 or receiving user input instructing automatic parking through the input device 180.

In addition, the vehicle 10 may control the ultrasonic sensor 110 to increase the maximum distance in the sensing distance of the ultrasonic sensor 110, thereby enhancing recognition performance of an object located at a long distance of the vehicle 10 when the steering device 150, the power device 160 and the braking device 170 are controlled to perform manual parking based on user operation. Through this, the vehicle 10 can secure a sensing distance (e.g., 1.2 m) in a Parking distance warning (PDW), thereby providing more stable parking assistance.

As a result, the vehicle 10 can provide a more efficient operation of the vehicle 10 by adaptively adjusting the sensing distance of the ultrasonic sensor 110 according to the operation of the vehicle 10.

According to the vehicle and the control method thereof according to one aspect, by adaptively adjusting the sensing distance of the ultrasonic sensor according to the operation of the vehicle, it is possible to smoothly provide a remote smart parking assist (RSPA) in a narrow space.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a steering device configured to steer a wheel;
a power device configured to transmit power to the wheel;
a braking device configured to brake the wheel;
an ultrasonic sensor configured to detect an external object;
an input device configured to receive an input from a user;
a transceiver configured to communicate with a user terminal; and
a controller configured to adjust a sensing distance of the ultrasonic sensor based on whether a user input for automatic parking is received through the input device or the transceiver and control at least one of the steering device, the power device, or the braking device based on an output of the ultrasonic sensor and the user input,
wherein the controller adjusts the sensing distance of the ultrasonic sensor by adjusting the output of the ultrasonic sensor.

2. The vehicle according to claim 1, wherein the controller is further configured to adjust the sensing distance of the ultrasonic sensor in a decreasing direction when receiving the user input for the automatic parking.

3. The vehicle according to claim 2, wherein the controller is further configured to adjust the sensing distance of the ultrasonic sensor in a decreasing direction when receiving a user input for a remote control through the transceiver.

4. The vehicle according to claim 3, wherein the controller is further configured to control at least one of the steering device, the power device, or the braking device based on the user input for the automatic parking or the user input for the remote control.

5. The vehicle according to claim 1, wherein the controller is further configured to adjust the sensing distance of the ultrasonic sensor in an increasing direction based on user operation of at least one of the steering device, the power device, or the braking device.

6. The vehicle according to claim 1, wherein the controller is further configured to adjust the sensing distance of the ultrasonic sensor by adjusting the output of the ultrasonic sensor.

7. The vehicle according to claim 6, wherein the controller is further configured to adjust the sensing distance of the ultrasonic sensor such that a minimum distance at which the external object can be detected is reduced when adjusting the sensing distance of the ultrasonic sensor in a decreasing direction.

8. The vehicle according to claim 1, wherein the controller is further configured to determine a degree of collision risk with the external object based on the output of the ultrasonic sensor and to control the braking device to brake when the degree of collision risk with the external object is greater than or equal to a preset value.

9. A control method of a vehicle comprising a steering device configured to steer a wheel, a power device configured to transmit power to the wheel, a braking device configured to brake the wheel, an ultrasonic sensor configured to detect an external object, an input device configured to receive an input from a user and a transceiver configured to communicate with a user terminal, the method comprising:
- adjusting a sensing distance of the ultrasonic sensor based on whether a user input for automatic parking is received through the input device or the transceiver; and
- controlling at least one of the steering device, the power device, or the braking device based on an output of the ultrasonic sensor and the user input,
- wherein the sensing distance of the ultrasonic sensor is adjusted by adjusting the output of the ultrasonic sensor.

10. The control method according to claim 9, wherein the adjusting a sensing distance of the ultrasonic sensor comprises:
- adjusting the sensing distance of the ultrasonic sensor in a decreasing direction when receiving the user input for the automatic parking.

11. The control method according to claim 10, further comprising:
- adjusting the sensing distance of the ultrasonic sensor in a decreasing direction when receiving a user input for a remote control through the transceiver.

12. The control method according to claim 11, wherein the controlling at least one of the steering device, the power device, or the braking device comprises:
- controlling at least one of the steering device, the power device, or the braking device based on the user input for the automatic parking or the user input for the remote control.

13. The control method according to claim 9, further comprising:
- adjusting the sensing distance of the ultrasonic sensor in an increasing direction based on user operation of at least one of the steering device, the power device, or the braking device.

14. The control method according to claim 9, wherein the adjusting a sensing distance of the ultrasonic sensor comprises:
- adjusting the sensing distance of the ultrasonic sensor by adjusting the output of the ultrasonic sensor.

15. The control method according to claim 14, wherein the adjusting a sensing distance of the ultrasonic sensor comprises:
- adjusting the sensing distance of the ultrasonic sensor such that a minimum distance at which the external object can be detected is reduced when adjusting the sensing distance of the ultrasonic sensor in a decreasing direction.

16. The control method according to claim 9, further comprising:
- determining a degree of collision risk with the external object based on the output of the ultrasonic sensor; and
- controlling the braking device to brake when the degree of collision risk with the external object is greater than or equal to a preset value.

* * * * *